J. SCHMIDLAPP.
Hook and Ladder Truck.
No. 97,969.
Patented Dec. 14, 1869.
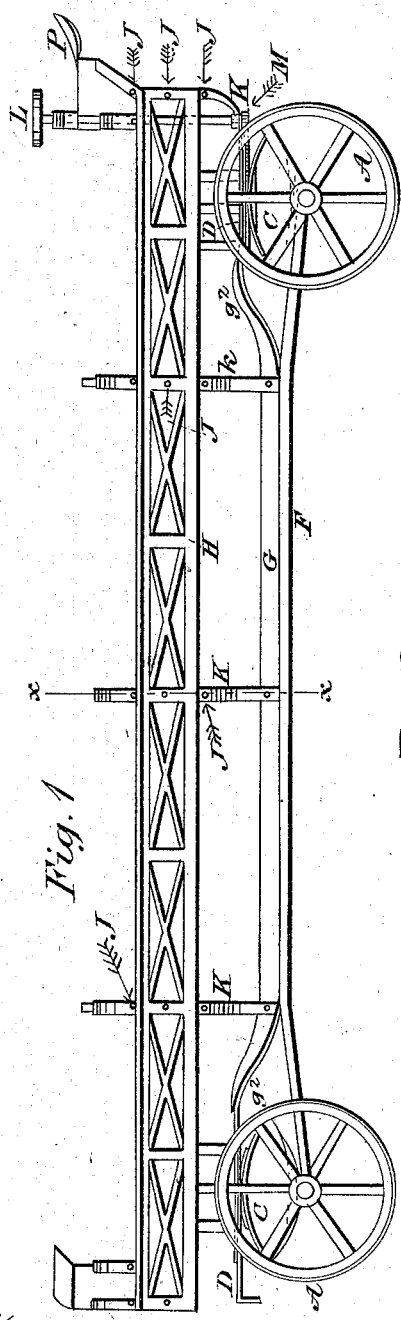
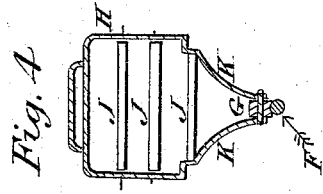
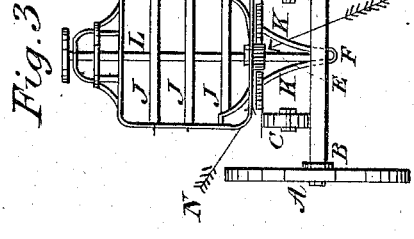
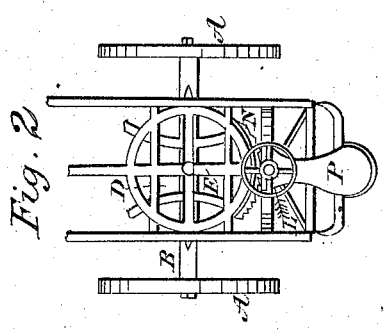
Witnesses:
Charles L. Barrett
Franklin Barritt
Inventor:
Jacob Schmidlapp

UNITED STATES PATENT OFFICE.

JACOB SCHMIDLAPP, OF NEW YORK, N. Y.

IMPROVEMENT IN HOOK-AND-LADDER TRUCKS.

Specification forming part of Letters Patent No. 97,869, dated December 14, 1869.

*To all whom it may concern:*

Be it known that I, JACOB SCHMIDLAPP, of the city, county, and State of New York, have invented certain new and useful Improvements in Firemen's Hook-and-Ladder Trucks; and I do hereby declare that the following is a full description of the same.

The nature of my invention consists in making the frame of the truck with sides, for the twofold purpose of strengthening and preventing the ladders from slipping off sidewise, in combination with a permanently-fixed steering-seat and removable steering-spindle, so that the ladders may be taken off endwise without unshipping the seat; also, in combining with the frame, having a permanent steering-seat attached thereto, a series of braces connected with or supported upon the truck-reach, having its ends slightly elevated above the line of the middle part of it, so as to allow the circle-plate and springs to work under it in turning curves or corners, without hinderance, as would be the case if the reach were straight.

But to describe my invention more particularly, I will refer to the accompanying drawings, forming a part of this specification, the same letters of reference, wherever they occur, referring to like parts.

Figure 1 is a side elevation of the "truck" or carriage. Fig. 2 is a plan view of the steering end of the truck. Fig. 3 is an end elevation of the same. Fig. 4 is a transverse cut section of the truck, through the line $x\,x$, Fig. 1.

Letter A represents the wheels of the truck; B, the axles; C, the elliptic springs for supporting the truck or carriage; D, the circle-plate for the axles to turn on, and E the king-bolt for connecting the fore and hind wheels to the body of the truck. As these several parts are common to all hook-and-ladder trucks, it is not deemed necessary to go into any particular description of them.

Letters F and G represent the reach for connecting the fore and hind wheels together, which is composed of two parts. The lower part, F, is an iron rod or bar, the ends of which are secured to the under side of the axles by the king-bolts, while the upper part, G, is made of wood, and has its ends bent up, as shown at $g^2$, Fig. 1, so as to form a permanent and secure connection with the circle-plate, secured to the under side of the truck-body, and thus leave ample space between the ends of the two parts of the reach for the elliptic springs to pass between them when turning the truck.

It will be obvious from this mode of constructing the reach that the lower part becomes an arch, because the upper part will not allow the wheels to separate; and in long trucks, from twenty to thirty feet long, as they are usually made, it is very important that the body should be firmly supported upon the running part of the truck. For this object, and in connection with the strengthening of the reach, the body H of the truck is made bridge-fashion—that is, the sides are made of trestle-work, either of metal or wood, though, as a rule, I consider iron the best. These sides are united together by means of a number of cross-bars, J, upon which friction-rollers are secured, and are so arranged, one above the other, as to admit of inserting the hooks and ladders between them, according to their different lengths—that is, between the lower set of rollers the short ladders are entered, while between the upper set only the longest ladders are entered, so as to be entirely out of the way of the horses. Underneath the truck or body are three, or more or less number, as may be desired, braces, K, which are bolted to the reach, and at their upper ends to the string-piece of the trestle-work. By this means the trestle is supported upon the arched-shaped reach, and thus the whole stiffened and strengthened, so as to support any number of ladders that can be imposed upon the truck.

Letter L represents the steering-spindle, the lower end of which is made so that it will fit into a pinion-wheel, M, which gears into a segmental-toothed plate, N, secured to the circle-plate D, so that by operating the spindle the truck may be turned or steered at the pleasure of the pilot occupying the seat P. To enable him to do so without risk of being thrown from his seat, in consequence of the elevated position of his seat and vibration of the truck, the seat is made solidly and securely to the truck-body, above the ladders, so that by withdrawing the spindle from the pinion-wheel the ladders may be withdrawn from the truck without unshipping the pilot's seat or compelling him to vacate the truck when dropping ladders at a fire.

Having now described my invention, I will proceed to set forth what I claim and desire to secure by Letters Patent of the United States:

1. The combination of the reach F and G with the trestle-work truck body or carriage H, all constructed substantially as hereinbefore set forth.

2. In combination with the carriage H, as hereinbefore set forth, the permanently-fixed pilot-seat P, attached thereto, and elevated above the ladders, for the purposes set forth, and substantially as described.

JACOB SCHMIDLAPP.

Witnesses:
CHARLES L. BARRITT,
FRANKLIN BARRITT.